US012653208B2

(12) United States Patent
Liang et al.

(10) Patent No.: US 12,653,208 B2
(45) Date of Patent: Jun. 16, 2026

(54) READY-TO-DRINK FORMULATION

(71) Applicant: SOCIETE DES PRODUITS NESTLE S.A., Vevey (CH)

(72) Inventors: Youyun Liang, Singapore (SG); Mengshan Wu, Melbourne (AU); Shuang Wu, Beijing (CN); Edwin Ananta, Epalinges (CH); Seinn Lae Waing, Singapore (SG); Zhongwei Sun, Xiamen (CN); Yuxi Deng, Bern (CH); Yi Teng Choo, Singapore (SG)

(73) Assignee: Societe des Produits Nestle S.A., Vevey (CH)

( * ) Notice: Subject to any disclaimer, the term of this patent is extended or adjusted under 35 U.S.C. 154(b) by 591 days.

(21) Appl. No.: 18/002,545

(22) PCT Filed: Jun. 22, 2021

(86) PCT No.: PCT/EP2021/067016
§ 371 (c)(1),
(2) Date: Dec. 20, 2022

(87) PCT Pub. No.: WO2021/259939
PCT Pub. Date: Dec. 30, 2021

(65) Prior Publication Data

US 2023/0225364 A1 Jul. 20, 2023

(30) Foreign Application Priority Data

Jun. 24, 2020 (EP) .................................... 20182105

(51) Int. Cl.
*A23J 3/34* (2006.01)

(52) U.S. Cl.
CPC .................................... *A23J 3/346* (2013.01)

(58) Field of Classification Search
CPC ........ A23C 11/106; A23L 11/60; A23L 11/50; A23J 3/346
USPC ......................................................... 426/656
See application file for complete search history.

(56) References Cited

FOREIGN PATENT DOCUMENTS

| | | |
|---|---|---|
| GB | 950046 | 2/1964 |
| JP | 2005204660 | 8/2005 |
| KR | 20190129626 A | 11/2019 |
| WO | 2019122499 A1 | 6/2019 |
| WO | 2020025856 A1 | 2/2020 |
| WO | 2020127358 A1 | 6/2020 |

OTHER PUBLICATIONS

Torsten et al. "Microbial Transglutaminase Is Immunogenic and Potentially Pathogenic in Pediatric Celiac Disease" Frontiers in Pediatrics, Dec. 2018, vol. 6, article 389, 7 pages.
Prakash et al. "A highly efficient and thermostable α-amylase from soya bean seeds" Biotechnol. Appl. Biochem, 2010, vol. 57, pp. 105-110.
Chile Office Action for Appl No. 202203627 dated Aug. 14, 2024, 17 pages.

(Continued)

*Primary Examiner* — Subbalakshmi Prakash
(74) *Attorney, Agent, or Firm* — K&L Gates LLP

(57) ABSTRACT

The present invention relates to ready-to-drink formulations, processes for making such formulations, and the use of a transglutaminase and an amylase to reduce the viscosity of such formulations.

17 Claims, 2 Drawing Sheets

A — Firm gel

B — Custard-like consistency

C — Smoothie-like consistency

(56) References Cited

OTHER PUBLICATIONS

Zhong et al., "Properties of Biotechnology Modified Corn", Journal of Harb in University of Commerce (Natural Sciences Edition), Dec. 2008, vol. No. 24, Issue. No. 6, pp. 698-700 and 720.
Chinese Office Action for Appl No. 202180042133.3 dated Sep. 29, 2025, 8 pages.

READY-TO-DRINK FORMULATION

CROSS REFERENCE TO RELATED APPLICATIONS

The present application is a National Stage of International Application No. PCT/EP2021/067016, filed on Jun. 22, 2021, which claims priority to European Patent Application No. 20182105.5, filed on Jun. 24, 2020, the entire contents of which are being incorporated herein by reference.

FIELD OF THE INVENTION

The present invention relates to ready-to-drink formulations, processes for making such formulations, and the use of a transglutaminase and an amylase to reduce the viscosity of such formulations.

BACKGROUND TO THE INVENTION

High protein, ready-to-drink beverages are a convenient source of protein, and are typically prepared from cow's milk. However, consumers worldwide are reducing their consumption of animal products for health, environmental and animal welfare reasons. Furthermore, lactose intolerance is a common digestive problem, and milk allergy is one of the most common allergies. As a result, the demand for plant-based products as milk alternatives is growing rapidly.

Protein denaturation and starch gelatinization during sterilizing heat treatment increases viscosity. Protein-specific enzymes have been used to reduce the viscosity of plant-based formulations. For example, transglutaminases have been shown to improve the heat stability of peanut flour dispersions (see Gharst et al., Journal of Food Science (2007) 72(7): C369-C375). However, these dispersions formed gels at temperatures as low as 78° C., with viscosity further increasing with temperature. Accordingly, such dispersions are unsuitable for use as sterile, ready-to-drink beverages.

The complexities of protein denaturation and starch gelatinization during sterilizing heat treatment mean that optimization of the viscosity of sterile, ready-to-drink beverages formulated from plant-based raw materials is far from straightforward. The present invention addresses this problem.

SUMMARY OF THE INVENTION

The inventors found that the viscosity of high temperature-processed, high protein formulations can be significantly reduced by incubating the protein with a transglutaminase and an amylase, before high-temperature-processing.

Accordingly, the present invention provides ready-to-drink formulations, and processes for preparing such formulations.

In a first aspect, the invention provides a process for preparing a ready-to-drink formulation comprising incubating a protein with a transglutaminase and an amylase, followed by high-temperature-processing at about 110° C. or above.

In some embodiments, a liquid is added to the protein prior to incubation with the transglutaminase and/or amylase. For example, the protein may be reconstituted or suspended in the liquid before incubation with the transglutaminase or amylase. For example, the liquid may be water, oil, milk, or combinations thereof. Preferably, the protein is reconstituted or suspended in water before incubation with the transglutaminase or amylase.

In some embodiments, the protein is incubated with the transglutaminase and the amylase simultaneously, sequentially or separately. Preferably, the protein is incubated with the transglutaminase and the amylase sequentially.

In some embodiments, the protein is incubated with the transglutaminase before it is incubated with the amylase, or the protein is incubated with the amylase before it is incubated with the transglutaminase. Preferably, the protein is incubated with the transglutaminase before it is incubated with the amylase.

In some embodiments, the protein is incubated with the transglutaminase for about 10 to about 180 minutes, preferably about 20 to about 120 minutes, more preferably about 30 to about 90 minutes, even more preferably about 40 to about 60 minutes, most preferably about 50 minutes.

In some embodiments, the protein is incubated with the transglutaminase at about 4° C. to about 60° C., preferably about 25° C. to about 55° C., more preferably about 37° C. to about 50° C., most preferably about 50° C.

In some embodiments, the protein is incubated with the transglutaminase while agitating at about 0 to about 2000 rpm, preferably about 300 to about 700 rpm, more preferably about 400 to about 600 rpm, most preferably about 500 rpm.

In some embodiments, the transglutaminase is subsequently inactivated, preferably by heating, more preferably by heating at about 70° C. or above.

In some embodiments, the transglutaminase is present in an amount of about 0.5 to about 5 U/g, preferably about 0.5 to about 2 U/g, relative to the weight of the protein.

In some embodiments, the transglutaminase is a microbial transglutaminase, preferably a *Streptomyces mobaraensis* transglutaminase.

In some embodiments, the protein is incubated with the amylase for about 2 to about 120 minutes, preferably about 5 to about 60 minutes, more preferably about 10 to about 30 minutes, most preferably about 15 minutes.

In some embodiments, the protein is incubated with the amylase at about 5° C. to about 110° C., preferably about 40° C. to about 100° C., more preferably 50° C. to about 90° C., even more preferably about 60° C. to about 80° C., most preferably about 70° C.

In some embodiments, the protein is incubated with the amylase while agitating at about 0 to about 2000 rpm, preferably about 300 to about 700 rpm, more preferably about 400 to about 600 rpm, most preferably about 500 rpm.

In some embodiments, the amylase is present in an amount of about 10 to about 1000 U/g, preferably about 10 to about 100 U/g, relative to the weight of the starch in the ingredients that are incubated with the transglutaminase and amylase. For example, when peanut meal is used as the source of protein, the amount of amylase may be relative to the weight of the starch in the peanut meal.

In some embodiments, the amylase is a plant amylase or a microbial amylase, preferably a microbial amylase, more preferably a *Bacillus amyloliquefaciens* amylase or a *Bacillus licheniformis* amylase.

In some embodiments, the high-temperature-processing is carried out at about 110° C. to about 150° C., preferably about 135° C. to about 150° C.

In some embodiments, the high-temperature-processing is carried out for about 5 seconds to about 60 minutes, preferably about 5 seconds to about 30 minutes, more preferably about 5 to about 60 seconds.

In some embodiments, the protein is a plant-based protein, preferably mung bean protein, peanut protein, soybean protein, flaxseed protein, canola protein, sunflower seed protein, cottonseed protein, rapeseed protein or chickpea protein, more preferably peanut protein.

In some embodiments, the plant-based protein is in the form of mung bean protein from noodle production, or in the form of meal from oil extraction of peanuts, soybeans, flaxseeds, canola, sunflower seeds, cottonseeds, rapeseeds or chickpeas, more preferably in the form of meal from oil extraction of peanuts.

In some embodiments, the process for preparing the ready-to-drink formulation further comprises addition of other ingredients, such as flavourings, colourants, gums/hydrocolloids, emulsifiers, oil, sugar, other sweeteners, other protein sources and/or fruit puree. Suitably, the addition may take place before, during or after incubation with the transglutaminase. Suitably, the addition may take place before, during or after incubation with the amylase.

In some embodiments, the ready-to-drink formulation is dairy-free. Alternatively, the ready-to-drink formulation may include one or more dairy products. Preferably the ready-to-drink formulation is suitable for vegans.

In some embodiments, the process for preparing the ready-to-drink formulation comprises the following steps:
    i) Incubating a protein with a transglutaminase;
    ii) Heating the protein from step i) to deactivate the transglutaminase;
    iii) Incubating the protein from step ii) with an amylase;
    iv) High-temperature-processing the protein from step iii) at about 110° C. or above.

In some embodiments, the process for preparing the ready-to-drink formulation comprises the following steps:
    i) Incubating a protein with an amylase;
    ii) Incubating the protein from step i) with a transglutaminase;
    iii) Optionally heating the protein from step ii) to deactivate the transglutaminase;
    iv) High-temperature-processing the protein from step iii) at 110° C. or above.

In some embodiments, the process for preparing the ready-to-drink formulation comprises the following steps:
    i) Incubating a protein with a transglutaminase: for about 30 to about 90 minutes, preferably about 40 to about 60 minutes; at about 25° C. to about 55° C., more preferably about 37° C. to about 50° C.; while agitating at about 300 to about 700 rpm, preferably about 400 to about 600 rpm;
    ii) Optionally heating the protein from step i): to inactivate the transglutaminase, for example at about 70° C. or above, for about 5 to about 20 minutes, more preferably about 10 to about 15 minutes;
    iii) Incubating the protein from step ii) with an amylase: for about 5 to about 60 minutes, preferably about 10 to about 30 minutes; at about 50° C. to about 90° C., more preferably about 60° C. to about 80° C.; while agitating at about 300 to about 700 rpm, preferably about 400 to about 600 rpm;
    iv) High-temperature-processing the protein from step iii): at about 110° C. to about 150° C., preferably about 135° C. to about 150° C.; for about 5 seconds to about 60 minutes, preferably about 5 to about 60 seconds.

In some embodiments, the process for preparing the ready-to-drink formulation comprises the following steps:
    i) Incubating a protein with an amylase: for about 5 to about 60 minutes, preferably about 10 to about 30 minutes; at about 50° C. to about 90° C., more preferably about 60° C. to about 80° C.; while agitating at about 300 to about 700 rpm, preferably about 400 to about 600 rpm;
    ii) Incubating the protein from step i) with a transglutaminase: for about 30 to about 90 minutes, preferably about 40 to about 60 minutes; at about 25° C. to about 55° C., more preferably about 37° C. to about 50° C.; while agitating at about 300 to about 700 rpm, preferably about 400 to about 600 rpm;
    iii) Optionally heating the protein from step ii): to inactivate the transglutaminase, for example at about 70° C. or above, for about 5 to about 20 minutes, more preferably about 10 to about 15 minutes;
    iv) High-temperature-processing the protein from step iii): at about 110° C. to about 150° C., preferably about 135° C. to about 150° C.; for about 5 seconds to about 60 minutes, preferably about 5 to about 60 seconds.

In some embodiments, the process for preparing the ready-to-drink formulation comprises the following steps:
    i) Reconstituting or suspending the protein in water, to give an amount of total solids of about 20 to about 40 weight %, preferably about 25 to about 35 weight %, relative to the total weight of the solids and water in the protein mixture;
    ii) Incubating the protein mixture from step i) with a transglutaminase: for about 30 to about 90 minutes, preferably about 40 to about 60 minutes; at about 25° C. to about 55° C., more preferably about 37° C. to about 50° C.; while agitating at about 300 to about 700 rpm, preferably about 400 to about 600 rpm;
    iii) Optionally heating the protein mixture from step ii): to inactivate the transglutaminase, for example at about 70° C. or above, for about 5 to about 20 minutes, more preferably about 10 to about 15 minutes;
    iv) Diluting the protein mixture from step iii) with water, to give an amount of total solids of about 10 to about 30 weight %, preferably about 15 to about 25 weight %, relative to the total weight of the solids and water in the protein mixture;
    v) Incubating the protein mixture from step iv) with an amylase: for about 5 to about 60 minutes, preferably about 10 to about 30 minutes; at about 50° C. to about 90° C., more preferably about 60° C. to about 80° C.; while agitating at about 300 to about 700 rpm, preferably about 400 to about 600 rpm;
    vi) Homogenizing the protein mixture from step v);
    vii) High-temperature-processing the protein mixture from step vi): at about 110° C. to about 150° C., preferably about 135° C. to about 150° C.; for about 5 seconds to about 60 minutes, preferably about 5 to about 60 seconds.

In some embodiments, the process for preparing the ready-to-drink formulation comprises the following steps:
    i) Reconstituting or suspending the protein in water, to give an amount of total solids of about 10 to about 30 weight %, preferably about 15 to about 25 weight %, relative to the total weight of the solids and water in the protein mixture;
    ii) Incubating the protein mixture from step i) with an amylase: for about 5 to about 60 minutes, preferably about 10 to about 30 minutes; at about 50° C. to about 90° C., more preferably about 60° C. to about 80° C.; while agitating at about 300 to about 700 rpm, preferably about 400 to about 600 rpm;
    iii) Incubating the protein mixture from step ii) with a transglutaminase: for about 30 to about 90 minutes, preferably about 40 to about 60 minutes; at about 25°

C. to about 55° C., more preferably about 37° C. to about 50° C.; while agitating at about 300 to about 700 rpm, preferably about 400 to about 600 rpm;

iv) Optionally heating the protein mixture from step iii): to inactivate the transglutaminase, for example at about 70° C. or above, for about 5 to about 20 minutes, more preferably about 10 to about 15 minutes;

v) Homogenizing the protein mixture from step iv);

vi) High-temperature-processing the protein mixture from step vi): at about 110° C. to about 150° C., preferably about 135° C. to about 150° C.; for about 5 seconds to about 60 minutes, preferably about 5 to about 60 seconds.

In a second aspect, the invention provides a ready-to-drink formulation obtained by the process for preparing a ready-to-drink formulation of the first aspect.

In a third aspect, the invention provides a ready-to-drink formulation prepared by a process comprising incubating peanut protein with a transglutaminase and an amylase.

In a preferred embodiment of the invention, the ready-to-drink formulation comprises 2 to 12 wt. % protein, preferably 2 to 6 wt. % protein. The fat content in the ready-to-drink formulation is preferably from 1 to 6 wt. %. The carbohydrate content in the ready-to-drink formulation is preferably 0.5 to 6 wt. %.

In some embodiments, the ready-to-drink formulation of the third aspect is obtained by the process for preparing a ready-to-drink formulation of the first aspect, wherein the protein is peanut protein.

In some embodiments, the ready-to-drink formulation has a viscosity of about 80% or less, preferably about 60% or less, than the viscosity of a reference sample as measured using a rheometer, wherein the reference sample is prepared in the same way as the ready-to-drink formulation, except the protein in the reference sample is not incubated with a transglutaminase or an amylase.

In a fourth aspect, the invention provides use of a transglutaminase and an amylase to reduce the viscosity of a ready-to-drink formulation that is high-temperature-processed at about 110° C. or above.

DETAILED DESCRIPTION OF THE INVENTION

Figure 1:
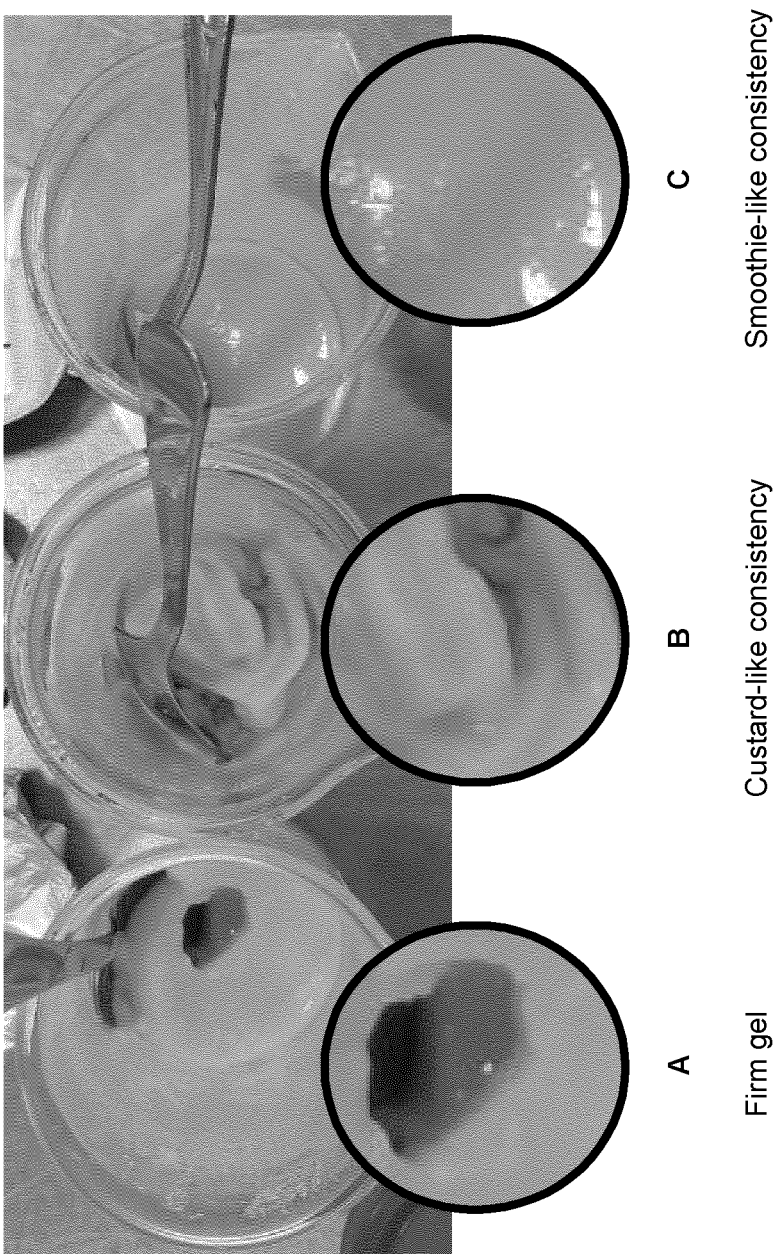
FIG. 1—Formulations prepared with chickpea flour. A: Reference Sample 3.2 from Example 3, prepared without enzyme treatment, was a firm gel after high-temperature-processing; B: Reference Sample 3.1 from Example 3, prepared with transglutaminase treatment but without amylase treatment, had a custard-like consistency after high-temperature-processing; C: Sample 3 from Example 3, prepared with transglutaminase and amylase treatment, had a smoothie-like consistency after high-temperature-processing.

Various preferred features and embodiments of the present invention will now be described by way of non-limiting examples.

It must be noted that as used herein and in the appended claims, the singular forms "a", "an", and "the" include plural referents unless the context clearly dictates otherwise.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

As used herein the term "about" means approximately, in the region of, roughly, or around. When the term "about" is used in conjunction with a numerical value or range, it modifies that value or range by extending the boundaries above and below the numerical value(s) set forth. In general, the terms "about" and "approximately" are used herein to modify a numerical value(s) above and below the stated value(s) by 10%.

The % values are in weight/weight %, unless otherwise specified.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Protein denaturation and starch gelatinization during sterilizing heat treatment increases viscosity. When proteins denature, aggregates form due to exposure of the protein's hydrophobic functional groups, which cause an increase in viscosity. Starch is insoluble in water, has a semi-crystalline structure and consists of two different types of polymers, amylose and amylopectin. When starch is heated in the presence of water, the semi-crystalline structure becomes less ordered and the starch undergoes gelatinization and pasting. This complex and irreversible loss of internal structure occurs at different temperatures depending on the starch origin. During gelatinization, the starch granules start to swell, the viscosity increases, native crystals melt, and the starch becomes dissolved in water. Pasting is a process that overlaps with gelatinization, and results in the development of viscosity. After the starch granules swell to their maximum, amylose and amylopectin are released from the granule, meaning the starch granule structure is lost and the viscosity decreases. During cooling, the amylose molecules begin to rearrange and crystalline aggregates are formed, which is called "retrogradation". During retrogradation, the viscosity increases and a gel is formed.

Accordingly, protein denaturation and starch gelatinization during sterilizing heat treatment complicate the optimization of the viscosity of sterile, ready-to-drink beverages formulated from plant-based raw materials.

Surprisingly, the present inventors have found that incubating a protein with a transglutaminase and an amylase results in substantial reduction in viscosity after high-temperature-processing that is not achievable by applying single enzymes.

Accordingly, in a first aspect, the invention provides a process for preparing a ready-to-drink formulation comprising incubating a protein with a transglutaminase and an amylase, followed by high-temperature-processing at about 110° C. or above.

In another aspect, the invention provides a ready-to-drink formulation obtained by the process for preparing a ready-to-drink formulation of the first aspect.

In another aspect, the invention provides a ready-to-drink formulation prepared by a process comprising incubating peanut protein with a transglutaminase and an amylase.

In another aspect, the invention provides use of a transglutaminase and an amylase to reduce the viscosity of a ready-to-drink formulation that is high-temperature-processed at about 110° C. or above.

Ready-to-Drink Formulation

As mentioned above, the invention relates to ready-to-drink formulations and processes for preparing ready-to-drink formulations. As defined herein, the term "ready-to-drink formulation" may refer to a liquid food that is ready to be consumed without further addition of liquid. The liquid food may be a beverage, such as a plant-based milk alternative, a dairy-free milkshake, a performance or medical nutrition product such as a protein shake, or a drink containing both dairy product(s) and plant-based protein.

Protein

As mentioned above, the process of the invention comprises incubating a protein with a transglutaminase and an amylase.

As defined herein, the term "protein mixture" refers to a mixture comprising the protein-containing raw material, and any water and/or further ingredients, at a given stage of the process of the invention.

The protein is preferably a plant-based protein. The term "plant-based" has its standard meaning in the art, i.e. derived from plants. Preferably, the protein is mung bean protein, peanut protein, soybean protein, flaxseed protein, canola protein, sunflower seed protein, cottonseed protein, rapeseed protein or chickpea protein, more preferably peanut protein.

Suitably, the plant-based protein may be in the form of mung bean protein from noodle production, or in the form of meal from oil extraction of peanuts, soybeans, flaxseeds, canola, sunflower seeds, cottonseeds, rapeseeds or chickpeas, preferably in the form of meal from oil extraction of peanuts.

Peanut meal is a high protein ingredient (containing about 50% protein and about 30% carbohydrates) left from the extraction of peanut oil. It represents a cost-effective source of protein, having a price per kg of around 30% relative to whole peanuts. As such, there are significant cost advantages from using peanut meal as an ingredient in the ready-to-drink formulations of the invention.

Incubation

As mentioned above, the process of the invention comprises incubating a protein with a transglutaminase and an amylase.

Suitably, the protein may be incubated with the transglutaminase and the amylase simultaneously, sequentially or separately.

For example, the protein may be incubated with the transglutaminase and the amylase concurrently.

For example, the protein may be incubated with the transglutaminase before it is incubated with the amylase, or the protein is incubated with the amylase before it is incubated with the transglutaminase. Preferably, the protein is incubated with the transglutaminase before it is incubated with the amylase.

Preferably, the protein is incubated with the transglutaminase and the amylase sequentially.

For example, the protein may be incubated sequentially with the transglutaminase then the amylase, or with the amylase then the transglutaminase. Preferably, the protein is incubated sequentially with the transglutaminase then the amylase.

During the incubation steps of the process of the invention, the protein mixture is heated sufficiently for the enzymes' activity to reduce the viscosity of the ready-to-drink formulation after high-temperature-processing.

Suitably, the temperature of the protein mixture between the first and second incubations may be adjusted. For example, if the first incubation temperature is higher than the second incubation temperature, the protein mixture may be cooled between the first and second incubations; or if the first incubation temperature is lower than the second incubation temperature, the protein mixture may be heated between the first and second incubations.

Transglutaminase

As mentioned above, the process of the invention comprises incubating a protein with a transglutaminase.

Suitably, the transglutaminase may be a microbial transglutaminase, preferably a *Streptomyces mobaraensis* transglutaminase.

Suitably, the transglutaminase may be present in an amount of about 0.5 to about 5 U/g relative to the weight of the protein, where U refers to the activity unit as provided by the enzyme supplier. For example, the transglutaminase may be present in an amount of about 0.5 to about 4 U/g, about 0.5 to about 3 U/g, about 0.5 to about 2 U/g, about 0.5 to about 1 U/g, about 1 U/g to about 5 U/g, about 1 U/g to about 4 U/g, about 1 U/g to about 3 U/g, about 1 U/g to about 2 U/g, about 2 U/g to about 5 U/g, about 2 U/g to about 4 U/g, about 2 U/g to about 3 U/g, about 3 U/g to about 5 U/g, about 3 U/g to about 4 U/g, or about 4 U/g to about 5 U/g, relative to the weight of the protein. Preferably, the transglutaminase is present in an amount of about 0.5 to about 2 U/g relative to the weight of the protein.

Suitably, the amount of total solids in the protein mixture immediately before the transglutaminase is added for incubation may be about 20 to about 40 weight %, relative to the total weight of the solids and water in the protein mixture. For example, the amount of total solids in the protein mixture may be about 20 to about 35 weight %, about 20 to about 30 weight %, about 20 to about 25 weight %, about 25 to about 40 weight %, about 25 to about 35 weight %, about 25 to about 30 weight %, about 30 to about 40 weight %, about 30 to about 35 weight %, or about 35 to about 40 weight %, relative to the total weight of the solids and water. Preferably, the amount of total solids in the protein mixture is about 25 to about 35 weight %, more preferably about 30 weight %, relative to the total weight of the solids and water.

Suitably, the protein may be incubated with the transglutaminase for about 10 to about 180 minutes. For example, the protein may be incubated with the transglutaminase for about 10 to about 150 minutes, about 10 to about 120 minutes, about 10 to about 90 minutes, about 10 to about 60 minutes, about 10 to about 40 minutes, about 10 to about 30 minutes, about 10 to about 20 minutes, about 20 to about 180 minutes, about 20 to about 150 minutes, about 20 to about 120 minutes, about 20 to about 90 minutes, about 20 to about 60 minutes, about 20 to about 40 minutes, about 20 to about 30 minutes, about 30 to about 180 minutes, about 30 to about 150 minutes, about 30 to about 120 minutes, about 30 to about 90 minutes, about 30 to about 60 minutes, about 30 to about 40 minutes, about 40 to about 180 minutes, about 40 to about 150 minutes, about 40 to about 120 minutes, about 40 to about 90 minutes, about 40 to about 60 minutes, about 60 to about 180 minutes, about 60 to about 150 minutes, about 60 to about 120 minutes, about 60 to about 90 minutes, about 90 to about 180 minutes, about 90 to about 150 minutes, about 90 to about 120 minutes, about 120 to about 180 minutes, about 120 to about 150 minutes, or about 150 to about 180 minutes. Preferably, the protein is incubated with the transglutaminase for about 20 to about 120 minutes, more preferably about 30 to about 90 minutes, even more preferably about 40 to about 60 minutes, most preferably about 50 minutes.

Suitably, the protein may be incubated with the transglutaminase at about 4° C. to about 60° C. For example, the protein may be incubated with the transglutaminase at about 10° C. to about 60° C., about 10° C. to about 50° C., about 10° C. to about 40° C., about 10° C. to about 30° C., about 10° C. to about 20° C., about 20° C. to about 60° C., about 20° C. to about 50° C., about 20° C. to about 40° C., about 20° C. to about 30° C., about 30° C. to about 60° C., about 30° C. to about 50° C., about 30° C. to about 40° C. about 40° C. to about 60° C., about 40° C. to about 50° C., about 40° C. to about 45° C., or about 50° C. to about 60° C. Preferably, the protein is incubated with the transglutaminase at about 25° C. to about 55° C., more preferably about 37° C. to about 50° C., most preferably about 50° C.

Suitably, the protein may be incubated with the transglutaminase while agitating at about 0 to about 2000 rpm. For example, the protein may be incubated with the transglutaminase while agitating at about 0 to about 1500 rpm, about 0 to about 1000 rpm, about 0 to about 750 rpm, about 0 to about 500 rpm, about 0 to about 250 rpm, about 0 to about 100 rpm, about 100 to about 2000 rpm, about 100 to about 1500 rpm, about 100 to about 1000 rpm, about 100 to about 750 rpm, about 100 to about 500 rpm, about 100 to about 250 rpm, about 250 to about 2000 rpm, about 250 to about 1500 rpm, about 250 to about 1000 rpm, about 250 to about 750 rpm, about 250 to about 500 rpm, about 500 to about 2000 rpm, about 500 to about 1500 rpm, about 500 to about 1000 rpm, about 500 to about 750 rpm, about 750 to about 2000 rpm, about 750 to about 1500 rpm, about 750 to about 1000 rpm, about 1000 to about 2000 rpm, about 1000 to about 1500 rpm, or about 1500 rpm to about 2000 rpm. Preferably, the protein is incubated with the transglutaminase while agitating at about 300 to about 700 rpm, more preferably about 400 to about 600 rpm, most preferably about 500 rpm.

Suitably, the transglutaminase may be inactivated subsequent to incubation of the protein with the transglutaminase. For example, the transglutaminase may be inactivated by heating, altering the pH, or any other method known to be suitable. Preferably, the transglutaminase is inactivated by heating. Suitably, the protein mixture may be heated sufficiently to deactivate the transglutaminase. For example, the transglutaminase may be inactivated by heating at about 70° C. or above.

Suitably, the transglutaminase may be inactivated by heating at an inactivation temperature for about 2 to about 30 minutes. For example, the transglutaminase may be inactivated for about 2 to about 25 minutes, about 2 to about 20 minutes, about 2 to about 15 minutes, about 2 to about 10 minutes, about 2 to about 5 minutes, about 5 to about 30 minutes, about 5 to about 25 minutes, about 5 to about 20 minutes, about 5 to about 15 minutes, about 5 to about 10 minutes, about 10 to about 30 minutes, about 10 to about 25 minutes, about 10 to about 20 minutes, about 10 to about 15 minutes, about 15 to about 30 minutes, about 15 to about 25 minutes, about 15 to about 20 minutes, about 20 minutes to about 30 minutes, about 20 minutes to about 25 minutes, or about 25 minutes to about 30 minutes. Preferably, the transglutaminase is inactivated for about 5 to about 20 minutes, more preferably about 10 minutes.

Amylase

As mentioned above, the process of the invention comprises incubating a protein with an amylase.

Suitably, the amylase may be a plant amylase or a microbial amylase, preferably a microbial amylase, more preferably a *Bacillus amyloliquefaciens* amylase or a *Bacillus licheniformis* amylase.

Suitably, the amylase may be present in an amount of about 10 to about 1000 U/g relative to the weight of the starch in the ingredients that are incubated with the transglutaminase and amylase, where U refers to the activity unit as provided by the enzyme supplier. For example, the activity unit U may be a Modified Wohlgemuth Unit (MWU) or a Kilo Novo Unit (KNU). For example, the amylase may be present in an amount of about 10 to about 750 U/g, about 10 to about 500 U/g, about 10 to about 250 U/g, about 10 to about 100 U/g, about 10 to about 50 U/g, about 50 to about 1000 U/g, about 50 to about 750 U/g, about 50 to about 500 U/g, about 50 to about 250 U/g, about 50 to about 100 U/g, about 100 to about 1000 U/g, about 100 to about 750 U/g, about 100 to about 500 U/g, about 100 to about 250 U/g, about 250 to about 1000 U/g, about 250 to about 750 U/g, about 250 to about 500 U/g, about 500 to about 1000 U/g, about 500 to about 750 U/g, or about 750 to about 1000 U/g, relative to the weight of the starch in the ingredients that are incubated with the transglutaminase and amylase. Preferably the amylase is present in an amount of about 10 to about 100 U/g relative to the weight of the starch in the ingredients that are incubated with the transglutaminase and amylase.

Suitably, the amount of total solids in the protein mixture immediately before the amylase is added for incubation may be about 10 to about 30 weight %, relative to the total weight of the solids and water in the protein mixture. For example, the amount of total solids in the protein mixture may be about 10 to about 25 weight %, about 10 to about 20 weight %, about 10 to about 15 weight %, about 15 to about 30 weight %, about 15 to about 25 weight %, about 15 to about 20 weight %, about 20 to about 30 weight %, about 20 to about 25 weight %, or about 25 to about 30 weight %, relative to the total weight of the solids and water. Preferably, the amount of total solids in the protein mixture is about 15 to about 25 weight %, more preferably about 20 weight %, relative to the total weight of the solids and water.

Suitably, the protein may be incubated with the amylase for about 2 to about 120 minutes. For example, the protein may be incubated with the amylase for about 5 to about 120 minutes, about 5 to about 90 minutes, about 5 to about 60 minutes, about 5 to about 45 minutes, about 5 to about 30 minutes, about 5 to about 20 minutes, about 5 to about 10 minutes, about 10 to about 120 minutes, about 10 to about 90 minutes, about 10 to about 60 minutes, about 10 to about 45 minutes, about 10 to about 30 minutes, about 10 to about 20 minutes, about 20 to about 120 minutes, about 20 to about 90 minutes, about 20 to about 60 minutes, about 20 to about 45 minutes, about 20 to about 30 minutes, about 30 to about 120 minutes, about 30 to about 90 minutes, about 30 to about 60 minutes, about 30 to about 45 minutes, about 45 to about 120 minutes, about 45 to about 90 minutes, about 45 to about 60 minutes, about 60 to about 120 minutes, about 60 to about 90 minutes, or about 90 to about 120 minutes. Preferably, the protein is incubated with the amylase for about 5 to about 60 minutes, more preferably about 10 to about 30 minutes, most preferably about 15 minutes.

Suitably, the protein may be incubated with the amylase at about 5° C. to about 110° C. For example, the protein may be incubated with the amylase at about 5° C. to about 90° C., about 5° C. to about 70° C., about 5° C. to about 50° C., about 5° C. to about 30° C., about 5° C. to about 15° C., about 15° C. to about 110° C., about 15° C. to about 90° C., about 15° C. to about 70° C., about 15° C. to about 50° C., about 15° C. to about 30° C., about 30° C. to about 110° C., about 30° C. to about 90° C., about 30° C. to about 70° C., about 30° C. to about 50° C., about 50° C. to about 110° C., about 50° C. to about 90° C., about 50° C. to about 70° C., about 70° C. to about 110° C., about 70° C. to about 90° C., about 80° C. to about 110° C., or about 90° C. to about 110° C. Preferably, the protein is incubated with the amylase at about 40° C. to about 100° C., more preferably about 50° C. to about 90° C., even more preferably about 60° C. to about 80° C., most preferably about 70° C.

Suitably, the protein may be incubated with the amylase while agitating at about 0 to about 2000 rpm. For example, the protein may be incubated with the amylase while agitating at about 0 to about 1500 rpm, about 0 to about 1000 rpm, about 0 to about 750 rpm, about 0 to about 500 rpm, about 0 to about 250 rpm, about 0 to about 100 rpm, about 100 to about 2000 rpm, about 100 to about 1500 rpm, about 100 to about 1000 rpm, about 100 to about 750 rpm, about 100 to about 500 rpm, about 100 to about 250 rpm, about 250 to about 2000 rpm, about 250 to about 1500 rpm, about 250 to about 1000 rpm, about 250 to about 750 rpm, about 250 to about 500 rpm, about 500 to about 2000 rpm, about 500 to about 1500 rpm, about 500 to about 1000 rpm, about 500 to about 750 rpm, about 750 to about 2000 rpm, about 750 to about 1500 rpm, about 750 to about 1000 rpm, about 1000 to about 2000 rpm, about 1000 to about 1500 rpm, or about 1500 rpm to about 2000 rpm. Preferably, the protein is incubated with the amylase while agitating at about 300 to about 700 rpm, more preferably about 400 to about 600 rpm, most preferably about 500 rpm.

Suitably, the amylase may be inactivated subsequent to incubation of the protein with the amylase. For example, the amylase may be inactivated by heating, altering the pH, or any other method known to be suitable. For example, after incubation with the amylase, the protein mixture may be heated sufficiently to deactivate the amylase, prior to further processing of the protein mixture.

Suitably, the amylase may be inactivated by heating at an inactivation temperature for about 2 to about 30 minutes. For example, the amylase may be inactivated for about 2 to about 25 minutes, about 2 to about 20 minutes, about 2 to about 15 minutes, about 2 to about 10 minutes, about 2 to about 5 minutes, about 5 to about 30 minutes, about 5 to about 25 minutes, about 5 to about 20 minutes, about 5 to about 15 minutes, about 5 to about 10 minutes, about 10 to about 30 minutes, about 10 to about 25 minutes, about 10 to about 20 minutes, about 10 to about 15 minutes, about 15 to about 30 minutes, about 15 to about 25 minutes, about 15 to about 20 minutes, about 20 minutes to about 30 minutes, about 20 minutes to about 25 minutes or about 25 minutes to about 30 minutes.

Suitably, the amylase may be inactivated by the high-temperature-processing of the protein mixture.

Liquid

As mentioned above, a liquid may be added to the protein prior to incubation with the transglutaminase and/or amylase. For example, the protein may be reconstituted or suspended in the liquid before incubation with the transglutaminase or amylase. For example, the protein may be diluted with the liquid before incubation with the transglutaminase or amylase. For example, the liquid may be water, oil, milk, or combinations thereof. Preferably, the liquid is water. More preferably, the protein is reconstituted or suspended in water before incubation with the transglutaminase or amylase.

For example, the protein may be reconstituted or suspended in the liquid before incubation with the transglutaminase, and subsequent incubation with the amylase; the protein may be reconstituted or suspended in the liquid before incubation with the amylase, and subsequent incubation with the transglutaminase; or the protein may be reconstituted or suspended in the liquid before concurrent incubation with the transglutaminase and the amylase. Preferably, the protein is reconstituted or suspended in the liquid before incubation with the transglutaminase, and subsequent incubation with the amylase.

Suitably, the reconstitution or suspension may be carried out using a mixing tank (jacketed or non-jacketed).

Suitably, the reconstitution or suspension may be carried out for about 5 to about 30 minutes. For example, the reconstitution or suspension may be carried out for about 5 to about 25 minutes, about 5 to about 20 minutes, about 5 to about 15 minutes, about 5 to about 10 minutes, about 10 to about 30 minutes, about 10 to about 25 minutes, about 10 to about 20 minutes, about 10 to about 15 minutes, about 15 to about 30 minutes, about 15 to about 25 minutes, about 15 to about 20 minutes, about 20 minutes to about 30 minutes, about 20 minutes to about 25 minutes, or about 25 minutes to about 30 minutes. Preferably, the reconstitution or suspension is carried out for about 10 to about 20 minutes, more preferably about 15 minutes.

Suitably, the reconstitution or suspension may be carried out at about 5° C. to about 70° C. For example, the reconstitution or suspension may be carried out at about 5° C. to about 60° C., about 5° C. to about 50° C., about 5° C. to about 40° C., about 5° C. to about 30° C., about 5° C. to about 20° C., about 5° C. to about 10° C., about 10° C. to about 70° C., about 10° C. to about 60° C., about 10° C. to about 50° C., about 10° C. to about 40° C., about 10° C. to about 30° C., about 10° C. to about 20° C., about 20° C. to about 70° C., about 20° C. to about 60° C., about 20° C. to about 50° C., about 20° C. to about 40° C., about 20° C. to about 30° C., about 30° C. to about 70° C., about 30° C. to about 60° C., about 30° C. to about 50° C., about 30° C. to about 40° C., about 40° C. to about 70° C., about 40° C. to about 60° C., about 40° C. to about 50° C., about 50° C. to about 70° C., about 50° C. to about 60° C., or about 60° C. to about 70° C. Preferably, the reconstitution or suspension is carried out at about 40 to about 60° C., most preferably about 50° C.

Suitably, the reconstitution or suspension may be carried out at about 300 to about 700 rpm. For example, the reconstitution or suspension may be carried out at about 300 to about 650 rpm, about 300 to 600 rpm, about 300 to about 550 rpm, about 300 to about 500 rpm, about 300 to about 450 rpm, about 300 to about 400 rpm, about 300 to 350 rpm, about 350 to about 700 rpm, about 350 to about 650 rpm, about 350 to 600 rpm, about 350 to about 550 rpm, about 350 to about 500 rpm, about 350 to about 450 rpm, about 350 to about 400 rpm, about 400 to about 700 rpm, about 400 to about 650 rpm, about 400 to 600 rpm, about 400 to about 550 rpm, about 400 to about 500 rpm, about 400 to about 450 rpm, about 300 to about 700 rpm, about 450 to about 650 rpm, about 450 to 600 rpm, about 450 to about 550 rpm, about 450 to about 500 rpm, about 500 to about 700 rpm, about 500 to about 650 rpm, about 500 to 600 rpm, about 500 to about 550 rpm, about 550 to about 700 rpm, about 550 to about 650 rpm, about 550 to 600 rpm, about 600 to about 700 rpm, about 600 to about 650 rpm, or about 650 to 700 rpm. Preferably, the reconstitution or suspension is carried out at about 400 to about 600 rpm, more preferably about 500 rpm.

Suitably, the amount of liquid may be adjusted before adding the second enzyme, to optimize its enzymatic activity. For example, the protein mixture may be diluted with the liquid, preferably water, before incubation with the second enzyme. For example, the protein mixture may be concentrated to remove water before incubation with the second enzyme. For example, the protein may be incubated with the transglutaminase, diluted, then incubated with the amylase; the protein may be incubated with the amylase, diluted, then incubated with the transglutaminase; the protein may be incubated with the transglutaminase, concentrated, then incubated with the amylase; or the protein may be incubated with the amylase, concentrated, then incubated with the transglutaminase. Preferably, the protein is incubated with the transglutaminase, diluted, then incubated with the amylase.

Suitably, the protein mixture may be diluted with the liquid, preferably water, or concentrated to remove water after incubation with both enzymes. Preferably, the protein is diluted with water after incubation with both enzymes.

Homogenization

Suitably, a homogenization step may be performed after incubation with both enzymes and before high-temperature-processing. The homogenization may be performed in a single-stage or two-stage homogenizer.

Suitably, the homogenization may be carried out with $P_2/P_1$ of about 0 to about 0.3, wherein $P_2$ is the back pressure and $P_1$ is the total homogenization pressure. For example, the homogenization may be carried out with $P_2/P_1$ of about 0.0, about 0.1, about 0.2 or about 0.3. Preferably, the homogenization is carried out with $P_2/P_1$ of about 0.2.

Suitably, $P_1$ may be about 100 to about 350 bar. For example, $P_1$ may be about 100 to about 300 bar, about 100 to about 250 bar, about 100 to about 200 bar, about 100 to 150 bar, about 150 to about 350 bar, about 150 to about 300 bar, about 150 to about 250 bar, about 150 to about 200 bar, about 200 to about 350 bar, about 200 to about 300 bar, about 200 to about 250 bar, about 250 to about 350 bar, about 250 to about 300 bar, or about 300 to about 350 bar. Preferably, $P_1$ is about 200 to about 300 bar.

High-Temperature-Processing

As mentioned above, the process of the invention involves high-temperature-processing at about 110° C. or above.

During the high-temperature-processing step of the process of the invention, the protein mixture is heated sufficiently to sterilize the ready-to-drink formulation, which may lengthen the shelf-life of the formulation.

Suitably, the high-temperature-processing may be carried out at about 110° C. to about 150° C. For example, the high-temperature-processing may be carried out at about 110° C. to about 145° C., about 110° C. to about 140° C., about 110° C. to about 135° C., about 110° C. to about 130° C., about 110° C. to about 125° C., about 110° C. to about 120° C., about 110° C. to about 115° C., about 115° C. to about 150° C., about 115° C. to about 145° C., about 115° C. to about 140° C., about 115° C. to about 135° C., about 115° C. to about 130° C., about 115° C. to about 125° C., about 115° C. to about 120° C., about 120° C. to about 150° C., about 120° C. to about 145° C., about 120° C. to about 140° C., about 120° C. to about 135° C., about 120° C. to about 130° C., about 120° C. to about 125° C., about 125° C. to about 150° C., about 125° C. to about 145° C., about 125° C. to about 140° C., about 125° C. to about 135° C., about 125° C. to about 130° C., about 130° C. to about 150° C., about 130° C. to about 145° C., about 130° C. to about 140° C., about 130° C. to about 135° C., about 135° C. to about 150° C., about 135° C. to about 145° C., about 135° C. to about 140° C., about 140° C. to about 150° C., about 140° C. to about 145° C., or about 145° C. to about 150° C. Preferably, the high-temperature-processing is carried out at about 135° C. to about 150° C.

Suitably, the high-temperature-processing may be carried out for about 5 seconds to about 60 minutes. For example, the high-temperature-processing may be carried out for about 5 seconds to about 45 minutes, about 5 seconds to about 30 minutes, about 5 seconds to about 15 minutes, about 5 seconds to about 5 minutes, about 5 seconds to about 120 seconds, about 5 seconds to about 60 seconds, about 5 seconds to about 30 seconds, about 30 seconds to about 60 minutes, about 30 seconds to 45 minutes, about 30 seconds to about 30 minutes, about 30 seconds to about 15 minutes, about 30 seconds to about 5 minutes, about 30 seconds to about 120 seconds, about 30 seconds to about 60 seconds, about 60 seconds to about minutes, about 60 seconds to about 45 minutes, about 60 seconds to about 30 minutes, about 60 seconds to about 15 minutes, about 60 seconds to about 5 minutes, about 60 seconds to about 120 seconds, about 120 seconds to about 60 minutes, about 120 seconds to about 45 minutes, about 120 seconds to about 30 minutes, about 120 seconds to about 15 minutes, about 120 seconds to about 5 minutes, about 5 minutes to about 60 minutes, about 5 minutes to about 45 minutes, about 5 minutes to about 30 minutes, about 5 minutes to about 15 minutes, about 15 minutes to about 60 minutes, about 15 minutes to about 45 minutes, about 15 minutes to about 30 minutes, about 30 minutes to about 60 minutes, about 30 minutes to about 45 minutes, or about 45 minutes to about 60 minutes. Preferably, the high-temperature-processing is carried out for about 5 seconds to about 30 minutes, more preferably about 5 to about 60 seconds.

Suitably, the high-temperature-processing may be carried out by direct or indirect heating. For example, the high-temperature-processing may be carried out by steam injection, heat exchange or using a retort.

Viscosity

As mentioned above, the invention provides use of a transglutaminase and an amylase to reduce the viscosity of a ready-to-drink formulation that is high-temperature-processed at about 110° C. or above.

Suitably, the ready-to-drink formulation may have a viscosity of about 80% or less than the viscosity of a reference sample, wherein the reference sample is prepared in the same way, except the protein in the reference sample is not incubated with a transglutaminase or an amylase. For example, the ready-to-drink formulation may have a viscosity of about 10 to about 80%, about 10 to about 70%, about 10 to about 60%, about 10 to about 50%, about 10 to about 40%, about 10 to about 30%, about 10 to about 20%, about 20 to about 80%, about 20 to about 70%, about 20 to about 60%, about 20 to about 50%, about 20 to about 40%, about 20 to about 30%, about 30 to about 80%, about 30 to about 70%, about 30 to about 60%, about 30 to about 50%, about 30 to about 40%, about 40 to about 80%, about 40 to about 70%, about 40 to about 60%, about 40 to about 50%, about 50 to about 80%, about 50 to about 70%, about 50 to about 60%, about 60 to about 80%, about 60 to about 70%, or about 70 to about 80%, of the viscosity of the reference sample. Preferably, the ready-to-drink formulation has a viscosity of about 20 to about 60% of the viscosity of the reference sample.

Suitably, the viscosity of the ready-to-drink formulation may be measured using a viscometer or a rheometer. Preferably, the viscosity is measured using a Brockfield RVD-VIII rheometer.

Further Ingredients

Suitably, the process for preparing the ready-to-drink formulation may further comprise the addition of other ingredients, such as flavourings, colourants, gums/hydrocolloids, emulsifiers, oil, sugar, other sweeteners, other protein sources and/or fruit puree. These are used in conventional amounts, which can be optimized by routine testing for any particular product formulation.

Suitably, the addition of the further ingredients may take place before, during and/or after incubation with the transglutaminase. Suitably, the addition of the further ingredients may take place before, during and/or after incubation with the amylase.

Suitably, the ready-to-drink formulation may be dairy-free. Alternatively, the ready-to-drink formulation may include one or more dairy products. Preferably the ready-to-drink formulation is suitable for vegans.

Those skilled in the art will understand that they can freely combine all features of the present invention disclosed herein. In particular, features described for the product of the present invention may be combined with the process of the present invention and vice versa. Furthermore, features described for different embodiments of the present invention may be combined. Where known equivalents exist for specific features, such equivalents are incorporated as if specifically referred to in this specification. Further advantages and features of the present invention are apparent from the Figures and non-limiting Examples.

EXAMPLES

The invention will now be further described by way of Examples, which are meant to serve to assist one of ordinary skill in the art in carrying out the invention and are not intended in any way to limit the scope of the invention.

Example 1—Formulations Prepared with Peanut Protein

Sample 1.1

90 g peanut protein powder (containing more than 50 weight % protein, about 32.5 weight % total carbohydrates, less than 10 weight % moisture, less than 5.5 weight % ash, and less than 2 weight % fat) was reconstituted with 210 g water in a Thermomix at 50° C. and 500 rpm for 15 minutes, to give an amount of total solids of 30%. The peanut protein mixture was incubated with 1.5 g of a transglutaminase from *Streptomyces mobaraensis* (100 U/g) at 50° C. for 50 minutes, with 500 rpm agitation, before heating at 70° C. for 10 minutes to deactivate the enzyme. Subsequently, the peanut protein mixture was diluted with 150 g warm water, to give an amount of total solids of 20%. The diluted peanut protein mixture was incubated with 0.018 g of a *Bacillus licheniformis* α-amylase (≥333,000 MWU/g) at 70° C. for 15 minutes, with 500 rpm agitation. The double enzyme-treated peanut protein mixture was subsequently diluted with 300 g water, to give an amount of total solids of 12%, and homogenized with a high speed homogenizer at 10,000 rpm for 10 minutes. The homogenized peanut protein mixture was then high-temperature-processed at 115° C. for 2 minutes. The viscosity of the resulting formulation was measured using a Brockfield RVDVIII rheometer at 25° C. and a shear rate of 75 seconds$^{-1}$.

Sample 1.2

180 g peanut protein powder (containing more than 50 weight % protein, about 32.5 weight % total carbohydrates, less than 10 weight % moisture, less than 5.5 weight % ash, and less than 2 weight % fat) was reconstituted with 420 g water in a Thermomix at 50° C. and 500 rpm for 15 minutes, to give an amount of total solids of 30%. The peanut protein mixture was incubated with 3.0 g of a transglutaminase from *Streptomyces mobaraensis* (100 U/g) at 50° C. for 50 minutes, with 500 rpm agitation, before heating at 70° C. for 10 minutes to deactivate the enzyme. Subsequently, the peanut protein mixture was diluted with 300 g warm water, to give an amount of total solids of 20%. The diluted peanut protein mixture was incubated with 0.036 g of a *Bacillus amyloliquefaciens* α-amylase (480 KNU-B/g) at 70° C. for 15 minutes, with 500 rpm agitation. The double enzyme-treated peanut protein mixture was subsequently diluted with 600 g water, to give an amount of total solids of 12%, and homogenized with a high speed homogenizer at 10,000 rpm for 10 minutes. The homogenized peanut protein mixture was then high-temperature-processed at 115° C. for 2 minutes. The viscosity of the resulting formulation was measured using a Brockfield RVDVIII rheometer at 25° C. and a shear rate of 75 seconds$^{-1}$.

Sample 1.3

90 g peanut protein powder (containing more than 50 weight % protein, about 32.5 weight % total carbohydrates, less than 10 weight % moisture, less than 5.5 weight % ash, and less than 2 weight % fat) was reconstituted with 210 g water in a Thermomix at 50° C. and 500 rpm for 15 minutes, to give an amount of total solids of 30%. The peanut protein mixture was incubated with 1.5 g of a transglutaminase from *Streptomyces mobaraensis* (100 U/g) at 50° C. for 120 minutes, with 500 rpm agitation, before heating at 70° C. for 10 minutes to deactivate the enzyme. Subsequently, the peanut protein mixture was diluted with 150 g warm water, to give an amount of total solids of 20%. The diluted peanut protein mixture was incubated with 0.018 g of a *Bacillus licheniformis* α-amylase (≥333,000 MWU/g) at 70° C. for 15 minutes, with 500 rpm agitation. The double enzyme-treated peanut protein mixture was subsequently diluted with 300 g water, to give an amount of total solids of 12%, and homogenized with a high speed homogenizer at 10,000 rpm for 10 minutes. The homogenized peanut protein mixture was then high-temperature-processed at 115° C. for 2 minutes. The viscosity of the resulting formulation was measured using a Brockfield RVDVIII rheometer at 25° C. and a shear rate of 75 seconds$^{-1}$.

Reference Sample 1

90 g peanut protein powder (containing more than 50 weight % protein, about 32.5 weight % total carbohydrates, less than 10 weight % moisture, less than 5.5 weight % ash, and less than 2 weight % fat) containing 50% protein, was reconstituted with 210 g water in a Thermomix at 50° C. and 500 rpm for 10 minutes then 750 rpm for 5 minutes, to give an amount of total solids of 30%. The peanut protein mixture was incubated with 1.5 g of a transglutaminase from *Streptomyces mobaraensis* (100 U/g) at 50° C. for 40 minutes, with 500 rpm agitation, before heating at 70° C. for 10 minutes to deactivate the enzyme. The peanut protein mixture was subsequently diluted with 450 g water, to give an amount of total solids of 12%, and homogenized with a high speed homogenizer at 10,000 rpm for 10 minutes. The homogenized peanut protein mixture was then high-temperature-processed at 115° C. for 2 minutes. The viscosity of the resulting formulation was measured using a Brockfield RVDVIII rheometer at 25° C. and a shear rate of 75 seconds$^{-1}$.

Results

The viscosities of double enzyme-treated Samples 1.1 to 1.3 were 5.490 mPa·s, 9.237 mPa·s and 10.56 mPa·s, respectively. In contrast, the viscosity of single enzyme-treated Reference Sample 1 was 99.00 mPa·s. These results show that treatment with both a transglutaminase and an amylase results in significant reduction of viscosity, in comparison with transglutaminase treatment only.

Example 2—High Protein Peanut Milk Alternative Prepared with Peanut Meal

Sample 2

90 g peanut protein powder (containing more than 50 weight % protein, about 32.5 weight % total carbohydrates, less than 10 weight % moisture, less than 5.5 weight % ash, and less than 2 weight % fat) was reconstituted with 210 g water in a Thermomix at 50° C. and 500 rpm for 15 minutes, to give an amount of total solids of 30%. The peanut protein mixture was incubated with 1.5 g of a transglutaminase from *Streptomyces mobaraensis* (100 U/g) at 50° C. for 50 minutes, with 500 rpm agitation, before heating at 70° C. for 10 minutes to deactivate the enzyme. Subsequently, the peanut protein mixture was diluted with 150 g warm water, to give an amount of total solids of 20%. The diluted peanut protein mixture was incubated with 0.018 g of a *Bacillus licheniformis* α-amylase (≥333,000 MWU/g) at 70° C. for 15 minutes, with 500 rpm agitation.

The double enzyme-treated peanut meal mixture was used in a high protein peanut milk recipe, with 9.6 weight % peanut meal combined with whole peanut paste to achieve a targeted protein content of 6 weight %. The resulting high protein peanut milk was then high-temperature-processed at 115 for 2 minutes. The viscosity of the resulting formulation was measured using a Brockfield RVDVIII rheometer at 25° C. and a shear rate of 75 seconds$^{-1}$.

Reference Sample 2.1

A first reference sample was prepared following the same method used to prepare Sample 2, but without adding the transglutaminase. The viscosity of the resulting formulation was measured using a Brockfield RVDVIII rheometer at 25° C. and a shear rate of 75 seconds$^{-1}$.

Reference Sample 2.2

A second reference sample was prepared following the same method used to prepare Sample 2, but without adding the transglutaminase or the amylase. The viscosity of the resulting formulation was measured using a Brockfield RVDVIII rheometer at 25° C. and a shear rate of 75 seconds$^{-1}$.

Results

The double enzyme-treated Sample 2 had the lowest viscosity (143 mPa·s) and remained liquid after high-temperature-processing, meaning it is suitable for use as a ready-to-drink formulation. The single enzyme-treated Reference Sample 2.1 was more viscous than Sample 2 (264 mPa·s). The untreated Reference Sample 2.2 was denatured and turned into a paste, with a high viscosity (327 mPa·s). These results show that treatment with both a transglutaminase and an amylase results in significant reduction of viscosity, in comparison with both treatment with an amylase only, and no enzyme treatment.

Example 3—Formulations Prepared with Chickpea Flour

Sample 3

50 g chickpea flour (containing about 48 weight % available carbohydrates, about 22 weight % protein, about 15 weight % fibers, less than 12 weight % moisture, about 4.5 weight % fat and about 2.5 weight % ash) was reconstituted with 200 g water in a Thermomix at 50° C. and 500 rpm for 50 minutes, to give an amount of total solids of 20%. The chickpea flour mixture was incubated with 0.835 g of a transglutaminase from *Streptomyces mobaraensis* (100 U/g) at 50° C. for 50 minutes, with 500 rpm agitation, before heating at 70° C. for 10 minutes to deactivate the enzyme. Subsequently, the chickpea flour mixture was incubated with 0.01 g of a *Bacillus licheniformis* α-amylase (≥333,000 MWU/g) at 70° C. for 15 minutes, with 500 rpm agitation. The double enzyme-treated chickpea flour mixture was subsequently high-temperature-processed at 115° C. for 2 minutes.

Reference Sample 3.1

A first reference sample was prepared following the same method used to prepare Sample 3, but without adding the amylase.

Reference Sample 3.2

A second reference sample was prepared following the same method used to prepare Sample 3, but without adding the transglutaminase or the amylase.

Results

The double enzyme-treated Sample 3 had a smoothie-like consistency after high-temperature-processing (FIG. 1C), meaning it is suitable for use as a ready-to-drink formulation. The single enzyme-treated Reference Sample 3.1 had a thick, custard-like consistency after high-temperature-processing (FIG. 1B), meaning it is unsuitable for use as a ready-to-drink formulation. The untreated Reference Sample 3.2 had a firm, gel-like consistency after high-temperature-processing (FIG. 1A), meaning it is very unsuitable for use as a ready-to-drink formulation. These results show that treatment with both a transglutaminase and an amylase results in significant reduction of viscosity, in comparison with both treatment with a transglutaminase only, and no enzyme treatment.

Example 4—Formulations Prepared with Sunflower Protein

Sample 4

45 g sunflower protein (containing more than 41 weight % protein, less than 16 weight % available carbohydrates, less than 13 weight % fats, more than 10.9 weight % fibers, more than 10 weight % moisture, and about 7.4 weight % ash) was reconstituted with 255 g water in a Thermomix at 50° C. and 500 rpm for 50 minutes, to give an amount of total solids of 15%. The sunflower protein mixture was incubated with 0.7515 g of a transglutaminase from *Streptomyces mobaraensis* (100 U/g) at 50° C. for 50 minutes, with 500 rpm agitation, before heating at 70° C. for 10 minutes to deactivate the enzyme. Subsequently, the sunflower protein mixture was incubated with 0.009 g of a *Bacillus licheniformis* α-amylase (≥333,000 MWU/g) at 70° C. for 15 minutes, with 500 rpm agitation. The double enzyme-treated sunflower protein mixture was subsequently high-temperature-processed at 115° C. for 2 minutes.

Reference Sample 4.1

A first reference sample was prepared following the same method used to prepare Sample 4, but without adding the amylase.

Reference Sample 4.2

A second reference sample was prepared following the same method used to prepare Sample 4, but without adding the transglutaminase or the amylase.

Results

Figure 2:
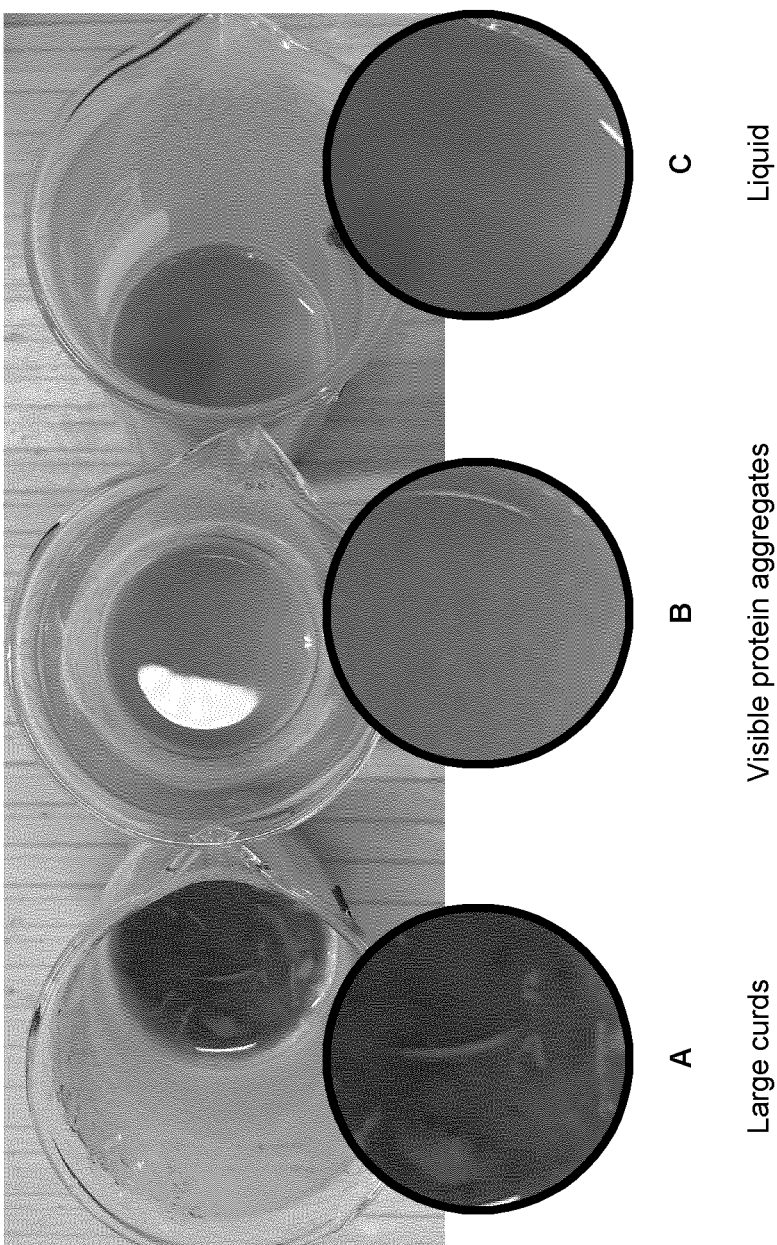
FIG. 2—Formulations prepared with sunflower protein. A: Reference Sample 4.2 from Example 4, prepared without enzyme treatment, had large visible curds after high-temperature-processing; B: Reference Sample 4.1 from Example 4, prepared with transglutaminase treatment but without amylase treatment, had visible protein aggregates after high-temperature-processing; C: Sample 4 from Example 4, prepared with transglutaminase and amylase treatment, remained a liquid after high-temperature-processing.

The double enzyme-treated Sample 4 remained liquid after high-temperature-processing (FIG. 2C), meaning it is suitable for use as a ready-to-drink formulation. The single enzyme-treated Reference Sample 4.1 had undesirable, visible protein aggregates after high-temperature-processing (FIG. 2B). The untreated Reference Sample 4.2 had undesirable, large curds after high-temperature-processing (FIG. 2A). These results show that treatment with both a transglutaminase and an amylase results in significant reduction of viscosity, in comparison with both treatment with a transglutaminase only, and no enzyme treatment.

All publications mentioned in the above specification are herein incorporated by reference. Various modifications and variations of the disclosed methods, compositions and uses of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention that are obvious to the skilled person are intended to be within the scope of the following claims.

The invention claimed is:

1. A process for preparing a ready-to-drink formulation, the process comprising:
    (i) incubating a protein with a transglutaminase;
    (ii) heating the protein from step i) to deactivate the transglutaminase; and
    iii) incubating the protein from step ii) with an amylase, followed by high-temperature-processing at about 110° C. or above,
    wherein the protein is reconstituted or suspended in water before incubation with the transglutaminase and the amylase.

2. The process for preparing a ready-to-drink formulation of claim 1, wherein the protein is incubated with the transglutaminase for about 10 to about 180 minutes.

3. The process for preparing a ready-to-drink formulation of claim 1, wherein the protein is incubated with the transglutaminase at about 4° C. to about 60° C.

4. The process for preparing a ready-to-drink formulation of claim 1, wherein the transglutaminase is a microbial transglutaminase; and the amylase is a microbial amylase.

5. The process for preparing a ready-to-drink formulation of claim 1, wherein the protein is incubated with the amylase for about 2 to about 120 minutes.

6. The process for preparing a ready-to-drink formulation of claim 1, wherein the protein is incubated with the amylase at about 5° C. to about 110° C.

7. The process for preparing a ready-to-drink formulation of claim 1, wherein the high-temperature-processing is carried out at about 110° C. to about 150° C.

8. The process for preparing a ready-to-drink formulation of claim 1, wherein the high-temperature-processing is carried out for about 5 seconds to about 60 minutes.

9. The process for preparing a ready-to-drink formulation of claim 1, wherein the protein is a plant-based protein.

10. A ready-to-drink formulation prepared by the process of claim 1, wherein the protein is peanut protein.

11. The process for preparing a ready-to-drink formulation of claim 1, wherein the transglutaminase is a *Streptomyces mobaraensis* transglutaminase, and the amylase is a *Bacillus amyloliquefaciens* amylase or a *Bacillus licheniformis* amylase.

12. The process for preparing a ready-to-drink formulation of claim 1, wherein the protein is incubated with the transglutaminase while agitating at about 300 to about 700 rpm.

13. The process for preparing a ready-to-drink formulation of claim 1, wherein the protein is incubated with the amylase while agitating at about 300 to about 700 rpm.

14. The process for preparing a ready-to-drink formulation of claim 1, wherein the transglutaminase is present in an amount of about 0.5 to about 5 U/g, relative to a weight of the protein.

15. The process for preparing a ready-to-drink formulation of claim 1, wherein the amylase is present in an amount of about 10 to about 100 U/g, relative to a weight of starch in ingredients that are incubated with the transglutaminase and the amylase.

16. The process for preparing a ready-to-drink formulation of claim 6, wherein the transglutaminase is inactivated by heating the protein at about 70° C. or above for about 5 to about 20 minutes.

17. The process for preparing a ready-to-drink formulation of claim 9, wherein the protein is a peanut protein.

* * * * *